May 27, 1941.  E. J. W. RAGSDALE ET AL  2,243,808
VEHICLE BODY CONSTRUCTION
Original Filed April 14, 1934    4 Sheets-Sheet 1
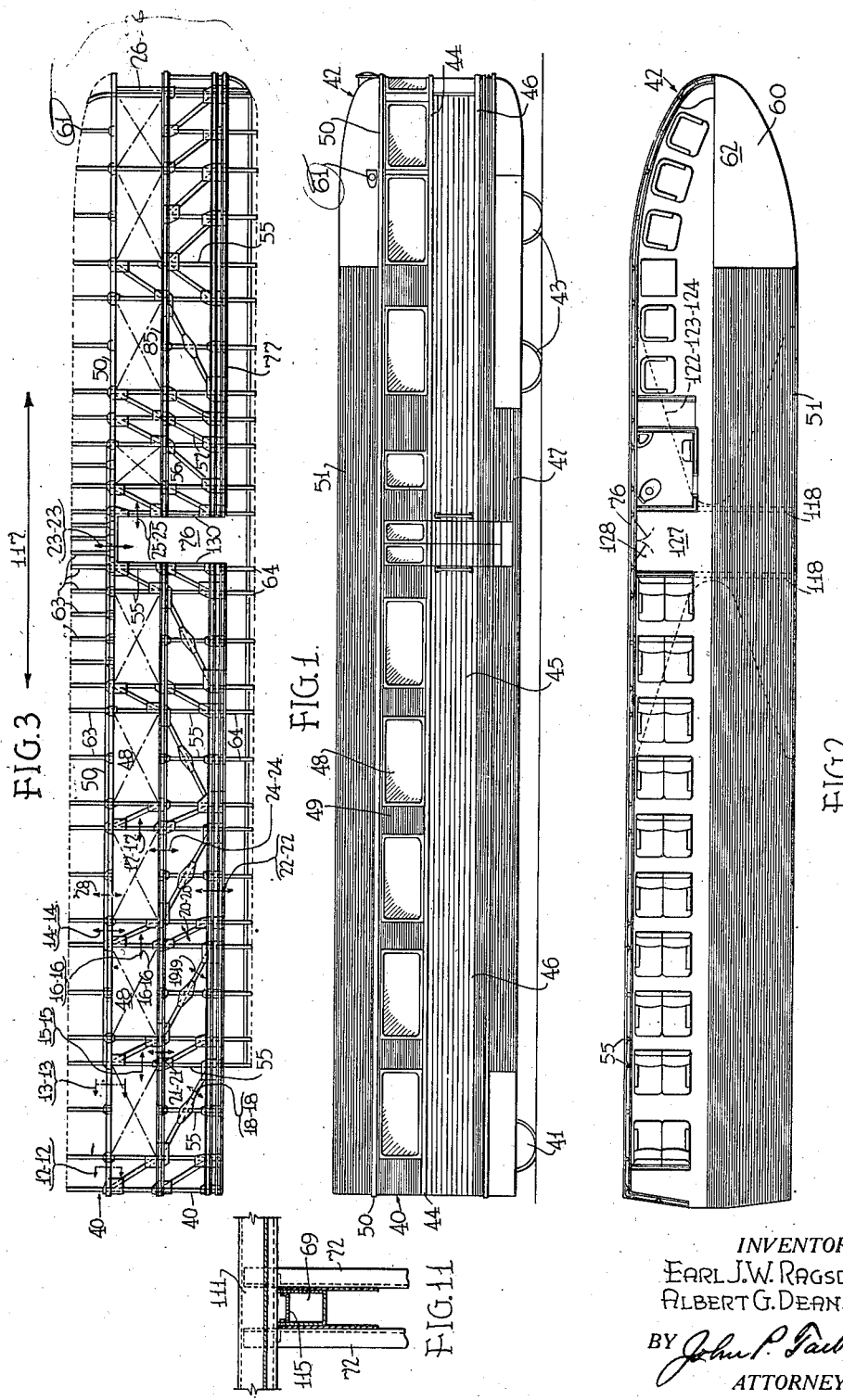
INVENTORS
Earl J. W. Ragsdale
Albert G. Dean.
BY John P. Jacobs
ATTORNEY.

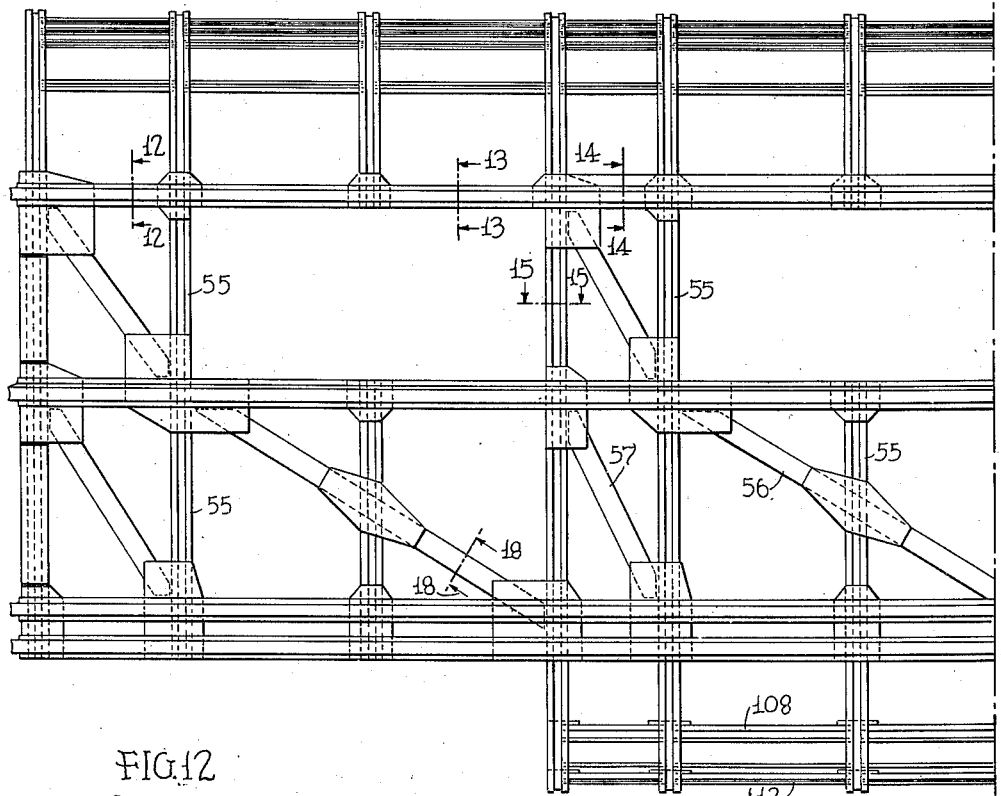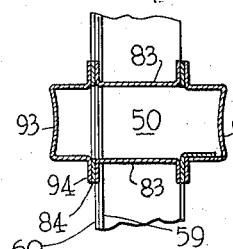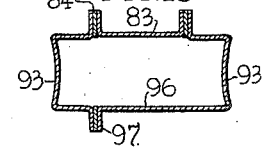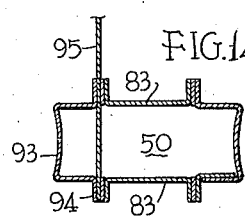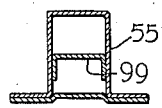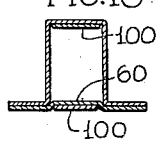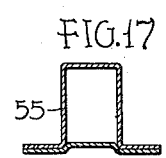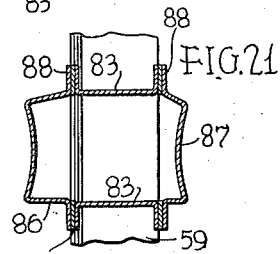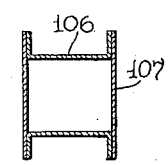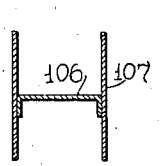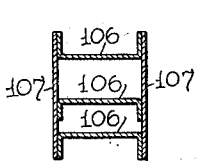

May 27, 1941.  E. J. W. RAGSDALE ET AL  2,243,808
VEHICLE BODY CONSTRUCTION
Original Filed April 14, 1934  4 Sheets-Sheet 3
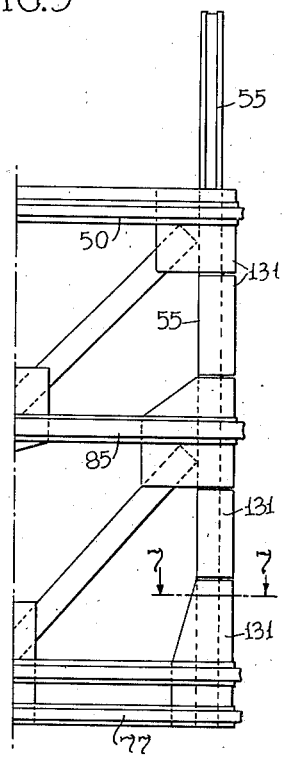
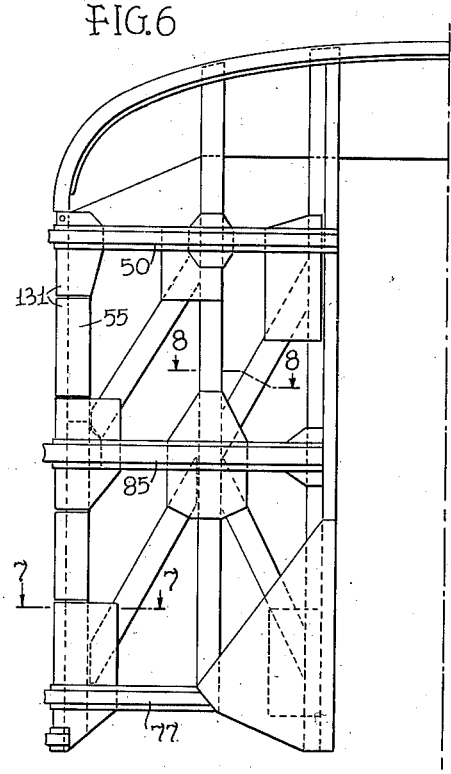
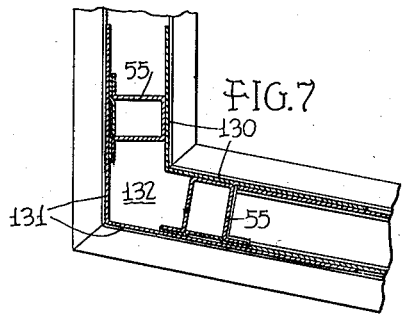
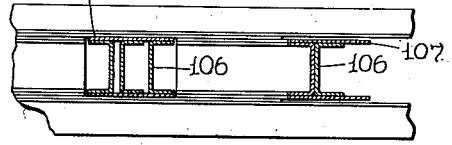
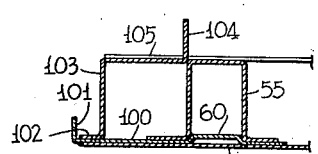
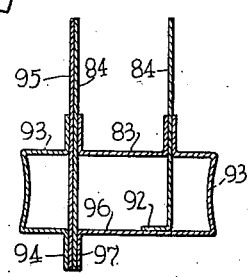
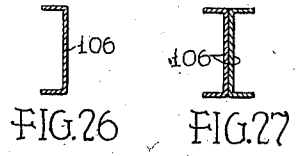
INVENTORS
EARL J.W. RAGSDALE
ALBERT G. DEAN
BY John P. Fairbro
ATTORNEY.

May 27, 1941.  E. J. W. RAGSDALE ET AL  2,243,808
VEHICLE BODY CONSTRUCTION
Original Filed April 14, 1934  4 Sheets-Sheet 4
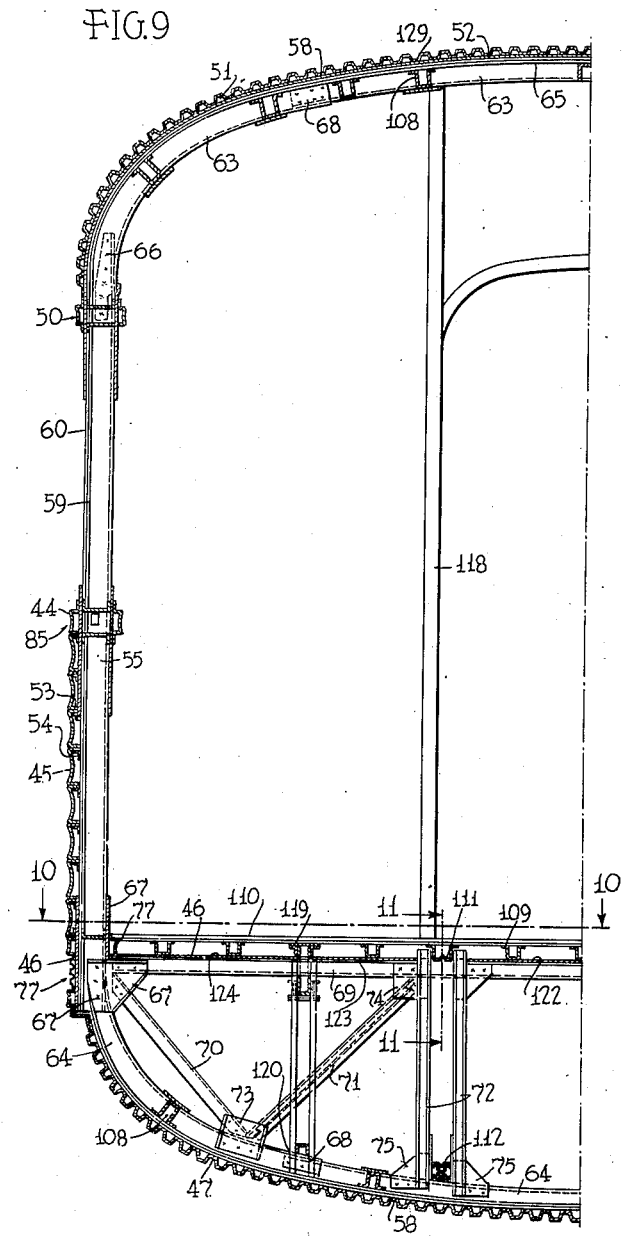
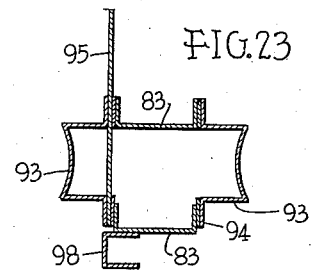
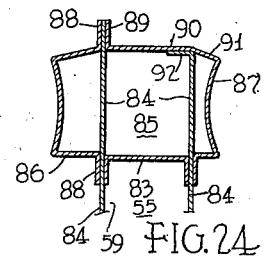
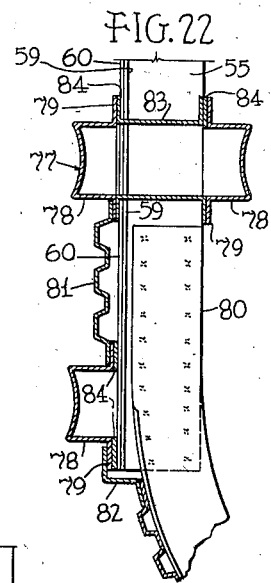
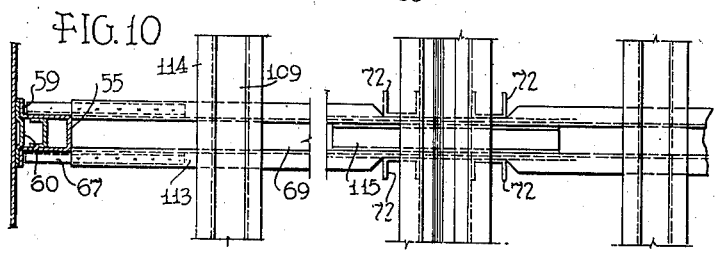
INVENTORS
EARL J.W. RAGSDALE
ALBERT G. DEAN.
BY John P. Saubys
ATTORNEY.

Patented May 27, 1941

2,243,808

UNITED STATES PATENT OFFICE 2,243,808

VEHICLE BODY CONSTRUCTION

Earl J. W. Ragsdale, Norristown, and Albert G. Dean, Narberth, Pa., assignors to Edward G. Budd Manufacturing Company, Philadelphia, Pa., a corporation of Pennsylvania Original application April 14, 1934, Serial No. 720,650, now Patent No. 2,171,434, dated August 29, 1939. Divided and this application March 4, 1938, Serial No. 193,870

33 Claims. (Cl. 105—399)

This is a division of copending application Ser. No. 720,650, filed April 14, 1934, now Patent No. 2,171,434, dated August 29, 1939.

This invention relates to rail cars of the extremely light weight high speed type today being commonly used in the composition of articulated trains for high speed service. These cars made of high tensile metal such as cold worked stainless steel or light weight aluminum, are being built in extremely light units only a minor fraction of the weight of standard railway cars for passenger and express service, are being organized together by connection to common trucks intermediate the cars, are being streamlined, and highly powered by gas electric power plants carried by the cars themselves. The trains so organized are expected to continue so organized over considerable periods of time and not to be shortened or lengthened through subtraction or addition of cars in daily use though such cars may be introduced from one period of the year to another by special operation in the yard or in the shop. Such trains afford a high speed, extremely economical, efficient, commodious and comfortable service of considerable profit to the railroads.

While the invention has this general adaptation, it may, of course, have other adaptation but it is without doubt especially adapted for this field.

Its objects are to increase the reduction in weight of such trains without decreasing their strength and safety, to actually increase their strength and safety while reducing the weight, to increase the facility of their fabrication, especially of high tensile stainless steel cold drawn and electrically spot welded, to improve the efficiency of the welding operations and the economy thereof, to improve the appearance of the train, to render the construction of more ready streamlining and afford application of streamlined sheathing with greater facility and greater smoothness of curvilinear contour, to afford a construction adaptable for general usage in connection with cars of different dimensions, and to facilitate the production methods employed.

Yet further objects are the arrangements for transversely and longitudinally strengthening the sub-flooring structure of the car to enable it to constitute more efficiently the bottom chord member of the truss involving the car at large, to encompass in its transverse cross sections spaces within which many of the car appliances may be contained and to provide for the enclosure of these equipment spaces and the sub-floor framings by streamline sheathings which, while affording resistance form to the exterior, nevertheless, provide free access to the spaces for installation, repair and replacement of equipment.

Still further, the invention has to do with the improvement in those flooring and side wall structures intersected by ways of ingress and egress to the car in such manner as to preclude weakening of the structure where such intersections occur.

That which is looked upon as the best embodiment of the invention at the present time is shown in the accompanying drawings of which—

Figure 1 is a side elevation of a rail car of such a train, in this instance the rearmost car of streamline form being shown in connection with the rear or right hand end.

Figure 2 is a plan view of the same with half of the roof section broken away to show the side wall in horizontal section and the seats in plan.

Figure 3 is a side elevation of the framework of the car showing particularly the side trussing and the vertically extending members of the transverse frames which are incorporated in this trussing.

Figure 4 is an enlargement of the left hand end of the framework of Fig. 3 adjoining the left hand end of the car.

Figure 5 is a partial such enlargement of the opposite side of this left hand end.

Figure 6 is an enlarged view of one-half of the left end elevation of the framework of Fig. 3, the half shown being that adjoining the side the portion of which is shown in Fig. 5, and which is the side opposite that shown in Fig. 3.

Figure 7 is a section on lines 7—7 of Figs. 5 and 6 looking in the direction of the arrows.

Figure 8 is a section on lines 8—8 of Fig. 6 looking in the direction of the arrows.

Figure 9 is one-half of a full transverse cross section of the car of Figs. 1 to 3.

Figure 10 is a plan view of the bottom portion of a transverse frame unit of Fig. 9 taken approximately on line 10—10 of Fig. 9 and with certain members broken away and foreshortened in order to compact the view.

Figure 11 is a section approximately on line 11—11 of Fig. 9 in the direction of the arrows.

Figures 12 to 28 inclusive are cross sectional details of the various members of the framework of Figs. 3 to 6 taken each upon the cross sectional lines designated in Figs. 3 to 6 by the numerals corresponding to the number of the figure, applied to opposite ends of the cross sectional lines, and looking in the direction of the applied arrows, in accordance with the customary practice.

The car depicted in side and end elevations and plan in Figs. 1 to 6 is the endmost car of a multiple car train. Its forward or left hand end designated 40 is substantially square ended and thereby adapted to adjoin the square ended rear end of the car in front through connection with a common truck the rear half of which is represented by the rear wheel 41 of the truck. The truck and the articulated connection of the cars thereto form no part of the present invention and are therefore not shown to any additional extent. The rear end of this car designated 42 is curvilinearly tapered as appears especially in the plan of Fig. 2 and thereby streamlined appropriately as the trailing end or tail of a streamline body. In the instance of the front or head car of the train it is the forward end (which in this case would be the left hand end of the car) which would be streamlined to curvilinear contour and in the instance of the forward end the contour would be appropriate for the leading end of the streamline body. This rear end 42 is supported by a truck individual to it represented as a four wheel truck through the showing in the elevation of Fig. 1 of two wheels 43.

The skeleton framework of the car depicted at large in Figs. 3 to 6 and 9 is of such longitudinal and transverse cross section as to afford a curvilinearly streamline form to the body of the car both transversely and longitudinally as appears particularly well in Fig. 9 from the transverse aspect and in Figs. 1 and 2 in the longitudinal aspect. This framework is covered by sheathing in the main longitudinally extending. The truss work of the side frames shown in Fig. 3 is sheathed below the belt line 44 at the level of the window sills with a relatively wide concavely cross sectioned longitudinally extending paneling 45 shown in cross section in Fig. 9. This paneling extends all the way down to the floor level 46. Below the floor 46, the under-framing is longitudinally sheathed by corrugated paneling 47, the corrugations of which are less in width than the concave elements of the paneling 45. Between the windows 48 the trusswork is sheathed by flat or finely longitudinally corrugated panelings 49. The roof above the top rails 50 finds the tops of the transverse frames of Fig. 9 sheathed throughout the roof by longitudinally extending and longitudinally corrugated paneling 51 very similar to the paneling 47 utilized to sheath the bottoms. The central portion of the top beyond the roof quarter is sheathed as shown by longitudinally extending corrugated paneling 52.

These panelings each through their longitudinally extending concavities or corrugations as the case may be, and through and by virtue of their frequent strong welded connection with the members of the framework of Figs. 3 to 6 and 9, especially with the vertically extending members of that framework, greatly increase the stiffness and strength of the side trusses at large as appearing in Fig. 3 and greatly increase the stiffness under compression strains of the roof members especially in the quarter sections of the roof covered by the longitudinally extended panelings 51. The side panelings 45 are provided, each concave section, with complemental inturned flanges 53 themselves electrically spot welded together and with angle brackets 54 spot welded the one branch to the flanges 53 and the other branch to the vertical members 55 of the side frame trussing and of the transverse frame units. They may also be connected through such angle brackets 54 with certain of the diagonal members, e. g. 56—57. So organized the concave cross section and the angle walled flanges afford a great stiffness and strength. Similarly the panelings 47—49—51 are joined at the bottoms 58 of the corrugations, by electrical spot welding, likewise to the vertically extending members 55 of the side frames and the transverse frame units of Fig. 9. These frame members 55 are in the main of channel cross section presenting outwardly as appears clearly in Fig. 4 and are provided with outturned flanges 59 to which these spot welded joinders are made either directly as in the case of joining the bottoms of the corrugations 58 of panelings 47—49—51 or indirectly as in the instance of joinder of panelings 45 through brackets 54. The mouths of the channels 55 may or may not be covered by cover plates 60 spot welded to these same flanges in which event the joinder of the paneling is by spot welding to flanges 59 through the cover plate thickness.

In the forward end of the car, the left end, these panelings terminate abruptly in a relatively sharp corner (see Figs. 2 and 7). In the rear end they are extended in flowing curvilinear lines of convergent form to a smoothly curvilinear extreme rear end. This rear end contour is characterized by a continuation of the floor line 46, the belt line 44, and the top rail 50 in parallelly extending horizontal planes all the way to the rear end and by the arrangement of the vertically extending members 55 of the side frames all truly vertical and parallel in those portions lying between the floor plane 46 and the top rail plane 50. Indeed, as clearly appears from Fig. 9, the truly vertical portions of the members 55 are extended somewhat beyond both the top rail plane 50 and the floor line 46 whereby all paneling between the planes 46 and 50 partakes of simple rather than compound curvature and the formation of the paneling to streamline form is facilitated. Similarly the transverse curvature of the panelings 47 and 51 is maintained of the same degree almost to the rear extremity of the car, only two frameworks removed therefrom as clearly appears in Figs. 1 and 3, that is to say, to the point 61, whereby the compound curvature rearwardly to this point 61 is not complex, and the form of the transverse frame units depicted in Fig. 9 is not changed except as to width. Thus there is left only the relatively small roof and bottom sections lying between the point 61 and the rear extremity where the compound curvature of the sheathing is complex. These relatively small areas designated 62 may then be hammered or die formed to shape.

The basis of the skeleton framework depicted at large in Figs. 3 to 6 and 9 and in detail in the remaining figures is the transverse frame unit of Fig. 9, details of which are shown in Figs. 10 and 11. This unit embodies not only the vertically extending posts 55 but the transversely extending and curvilinear top and bottom members 63 and 64. In fact the panelings 47 and 51 are secured in large part to the curvilinearly extending lateral extremities of these top and bottom members 63 and 64. These members like the posts 55 are of channel cross section presenting outwardly of the framework and having outturned side flanges 65. The cross sections correspond in general to the dimension of the cross section of the posts 55 and lap these cross sections just above the top rail 50 in the one case and just below the floor line 46 in the other case. At these points of lap the side walls are spot welded together through side wall gussets 66 and 67 of appropriate extent and cross section. To facilitate fabrication of the extremely curvilinear portions on the roof and bottom quarters in the region of the panelings 41—51, they may be fabricated separately from the central less curvilinearly formed portions and lap joined thereto by spot welding as indicated at 68. All of these channel cross sections may be closed across their mouths in the same manner as the channel cross section of the posts 55 as shown in Fig. 10.

While the top or roof section of the frame units 9 is simple in form as illustrated, consisting principally of the curvilinearly transversely extending portion 63, the bottom is compound in form, the bottommost member 64 being combined with the transverse horizontally extending floor beam 69 through intervened diagonal and vertical struts 70—71—72 to constitute a deep bottom truss, the outlines of which encompass considerable of the space below the floor beams 69. In the achievement of this the floor beams 69, themselves of upwardly presenting channel cross section as appearing in Figs. 10 and 11 and continuous from side to side of the frame unit, are joined, at their opposite ends through gussets 61 which exteriorly overlap their side walls, directly to the side walls of posts 55 and bottom frame members 64. Outturned flanges on the gussets 67 bear upon outturned flanges on the floor beams 69 and are spot welded thereto. These same gussets 67 receive the upper ends of the channel sectioned diagonal struts 70 which are secured thereto by welding while the lower ends of struts 70 are received by and secured by external gussets 73 commonly exteriorly lapping the side walls of the member 64 and welded thereto. A compound diagonal strut 71 of hollow cross section interconnects by its opposite ends gussets 73 and gussets 74 of elongated extent welded to the floor beam 69 intermediate its middle and its end. Pairs of vertical struts 72 spaced somewhat apart are welded exteriorly of gussets 74 by the bottoms of the channel cross section and at their lower ends through similar connection to spaced gussets 75 to the side walls of the bottom member 64. As a matter of fact there are four of these vertical struts 72 in this plane, one pair 72 on each side of the floor beam 69 and member 64 as clearly appears from a plan view of Fig. 10. So organized, as will be clearly apparent, the struts 70—71—72 triangularly interconnect the members 64 and 69 after the fashion of a Warren truss and afford the relatively deep truss a great strength.

There are a large number of these transversely extending frame units in the skeleton framework of Fig. 3, there being located one flanking each window opening 48 and each door opening 76 and at each extremity of the car body. Intermediate the sides of the window openings there are intermediate such transverse frame units as indicated, essentially similar to the principal such units, differing therefrom principally in the breaking of the posts 55 at the window openings 48. They are interconnected not only by the longitudinally extending sheathing 45—47—49—51 previously described but also by longitudinally and diagonally extending framing now to be described, forming side wall load carrying trusses therewith.

The vertically extending posts or struts 55 of the frame are interconnected at their bottoms by bottom rails 77 of compound cross section appearing in Fig. 9 near the floor level 46 and the transverse cross section of which taken on line 22—22 of Fig. 3 is depicted in Fig. 22. These bottom rails are comprised of three similarly cross sectioned longitudinally extending channel members 78 each presenting toward the post 55 and provided with outturned flanges 79 through which they are spot welded to the flanges 59 and the bottom wall 80 of the channel of the post. There are two of these opposite each other just at the floor level and one just below at the bottom end of the post 55 and on the outside of it. Spaced between the upper and lower channels 78 there is secured a section of longitudinally corrugated sheathing 81 the edges of which are spot welded to the flanges 79 and therethrough to flanges 59 of the post. Below the lower channel 78 there is provided a longitudinally extending stringer 82 of Z cross section one arm of which is welded to flange 79 of the channel the main body of which is welded to the sheathing 47 and members 64. The flanges 79 of the upper and juxtaposed channels 78 are joined together by channels 83 the side walls of which are welded to flanges 79. These channels extend from one post 55 to the next adjoining thereby constituting the juxtaposed channels 78 a full box cross section as clearly appears in Fig. 22. The exterior and interior paneling or gusseting or bracketing as may be desired will be provided with a longitudinally extending side edge 84 lap welded to intermediate flanges 79 and side walls of channels 83 by multiple welds. The structure is extended longitudinally of the car from end to end, the members 78 being continuous and the members 83 broken only by the posts 55 but reinforced at these points by the intermediate laps 84 of material which bridge across the post 55 and longitudinally reinforce the structure at these points where channels 83 are discontinuous. Such members 84 are also provided in connection with the lower channel 78 and have the same purpose of reinforcement, thus there is constituted a longitudinally extending girder of great stiffness and strength and at the same time through the prominence given the channels 78 and the contours thereof and of the paneling 81 affording ornamental moulding characteristics of an attractive order. The members 84 also serve as spacers between channels 83 and flanges 79 which will admit free use of gussets at the points of juncture of the various truss elements without disturbing the rectilinear course of the channel 78 and flanges 79. At these points of juncture the members 84 are terminated and the gussets supplant them.

At the belt line 44 there is located a longitudinally extending belt rail designated generally in Fig. 9 by the numeral 85. This belt rail also constitutes the window sills, the section of the rail at various points designated respectively 21—21 and 24—24 in Fig. 3 is shown in Figs. 21 and 24. Fig. 21 shows the section intermediate the windows 48 while Fig. 24 shows the section in the windows 48 transversely of the window sill. As in the instance of the bottom rail 77, the rail 44 is composite. In this case it is formed of an outer longitudinally extending sheet metal channel 86 and an inner longitudinally extending channel 87 of somewhat shallower depth than the channel 86. The side walls of both channels carry laterally extending flanges 88 through which they are welded to the post 55 and to the sections of the paneling 45 and 49 appearing in Figs. 1 and 9. As in the instance of the bottom rail 77 just described, between the flanges 88 of channels 86—87 and the flanges 59 of the posts there are intervened members 84 which are the gussets at the posts 55 and spacers intermediate the posts which admit the gussets without diverting the rectilinear course of the channels 86. In certain instances the members 84 may be flanges on the paneling, but outstandingly, they are the gussets or spacers. In between the windows as shown by the section of Fig. 21 the channels 86 and 87 are joined together by transversely arranged channels 83 of the same order as those 83 bearing the connection which the bottom rail 77 of Fig. 22 and in the same manner are joined the side walls of 83 to the flanges 88. The channels 83 are of the same extent, extending from one post 55 to the next adjoining. Thus, as clearly appears in Fig. 21, the section of the belt rail is a box cross section between the posts. Within the windows, as appears in Fig. 24, channels 83 are provided at the bottom of the cross section only. At the top the inner channel 87 has its upper side wall extended all the way across to the outer channel 86 and is there provided with a flange 89 mating with and welded to the flange 88 of the other channel. This provides an uninterrupted upper wall 90 to constitute the face of the window sill proper and to admit the placement of windows from the inside of the car to lie against flanges 88 and 89 which are disposed at the outside. To facilitate this the upper angle of channel 87 adjoining wall 90 is formed with a bevel 91, or perhaps its equivalent, a rounded corner. In the interest of added strength the members 84 are carried all the way through the window sill, the outer one in the usual manner of the gussets at the post, the inner one at the bottom in the usual manner but at its upper edge by providing it with an outturned flange 92 and spot welding this flange to the face 90 of the window sill.

Above the windows 48 the top rail designated generally 50 in Figs. 1 to 6 and 9 is also constituted of box section composed of a quadrangular arrangement of channel cross sections similar to those employed in connection with the bottom rail 77 and the belt rail 85. This appears from the sections of Figs. 12, 13, 14, 28 and 23 taken respectively on the lines of corresponding number in Figs. 3 and 4. Sections of Figs. 12 and 14 are taken without the windows 48 and between adjacent posts 55. The compound structure in such case is composed similarly in all essential respects to the compound structure of the belt rail 85 as can be seen by comparing Figs. 12 and 14 with Fig. 21, and also similarly to the upper part of the bottom rail 77. Thus there are used inner and outer vertically disposed channels 93 and upper and lower horizontally disposed channels 83 the former being longitudinally continuous across posts 55 and the latter extending between posts only. The flanges 94 of the inner and outer channels 93 are joined to the side walls of the channels 83 through the intervened members 84 of the same order as those used in the belt and bottom rails. These top rails 50 differ in these sections principally by being vertically shallow. However, the section of Fig. 14 is marked by the inter-position of a longitudinally continuous vertically extending web member 95 between the side walls of channels 83 and flanges 94 of channels 93 which member, as clearly appears from Fig. 14 and Fig. 3, is extended vertically above the box cross section of the top rail 50 a considerable distance, and is extended longitudinally over a considerable length of the car body. This member 95 is of considerable thickness and is so placed for the purpose of stiffening and strengthening the top rail throughout the region in which it is used as will more fully appear. This it does by sub-dividing and stiffening the main box section and by entering into angular formation with the top walls of the box section, deepening and increasing the effective area of the section at large.

Within the windows 50 and within the doorway 76 the sections 13, 28, and 23 are taken. Here (in Figures 13 and 28) the box cross sections are constituted of three channel members only, the outer 93, the inner 93, and the upper of the channels 83, and the section is completed at the bottom by extending the lower side wall of the inner channels 93 outwardly to meet the lower side wall 96 outwardly and there providing it with a flange 97, this construction being similar to that utilized at the window sills shown in Fig. 24. Here too members 84 are utilized in essentially the same manner as at the window sills, the inner of these members being provided with a flange 92 as in the instance of the sill of Fig. 24. In addition, however, to the members 84 there is utilized the member 95 in a main body continuation, the same member appearing in the section of Fig. 14 and which extends all the way across the center part of the car and across the side door 76. The flanges 94—97 and the members 84 and 95 are through welded from face to face of their multiple laps. At the door 76 the section of Fig. 23 is taken. Here member 95 also appears in the same relation to the other elements of the top rail as in Fig. 28 in the window opening. But at this section 23 in the door opening the extension of the inner channel 93 to meet the outer channel 93 is not by integral extension of the bottom wall but by non-integral such extension, the extension being made by means of a channel 83 which has been obverted, from the position of the bottom channel 83 usually occupied, to present upwardly as in case of the upper channel 83. However, the joinder is likewise by means of welding the side walls of the channel to the bottom flanges 94 of the channels 93. Thus there is formed a rabbeted upper door jamb the rabbet lying inwardly between the lower side wall of the inner channel 93 and the flange 94 and the main body of the jamb being constituted by the bottom of the channel 83. To the bottom of this channel is welded by its side wall a weather strip and stop channel 98. Such are the various bottom, belt and top rail structures.

The transverse frames of Fig. 9 and the rail structures just described are vertically inter-braced by the posts 55 of the transverse frames and diagonally inter-braced by the system of diagonal braces appearing particularly in Figs. 3 to 6. The rigidity of the bracing of the posts 55 with the transverse frames is varied from point to point in accordance with the stress needed to be met by varying the reinforcements of the post 55 as clearly appears in Figs. 15, 16 and 17 taken on lines of corresponding number in Figs. 3 and 6. Thus the post 55 of Fig. 15 is reinforced by a channel 99 nested within it intermediate the top and bottom of the channel of the post and secured thereto by inter-welding of the side walls. Thus the base of the post of Fig. 16 is reinforced by strips of material 100 welded both to the bottom of the channel of post 55 and to the cover plate 60 of this channel. Thus the post of section of Fig. 17 is unprovided with reinforcements. Thus the door post of Fig. 25 at the right of the doorways 76 is reinforced and enlarged by providing cover plate 60 with an extension 100 into the doorway and then providing it with an inturned flange 101. This extension is welded by the flange 102 to a Z shaped vertically extending member 103 the dimensions of the main body and the outer arm of which are such as to form with the adjoining side wall of the post 55 an augmenting box section greatly enlarging the crosssectional area of the member as a whole. The inner arm 104 of this Z section member 103 extends inwardly of the body to form the rabbet complemental to that formed by channel 93 and flange 94 at the top of the door as shown in Fig. 23, while the outer arm of the Z together with flanges 102 and 101 form a weather strip and stop channel similar to the channel 98 and in the same door plane. The terminal portions 105 of the various inner and outer sheathings assist in strengthening this structure.

The diagonal braces are shown particularly by the sections of Figs. 18 to 20, 26 and 27 and are various in accordance with the various stresses required to be met. Thus the member of Fig. 18 is a box cross section comprised of oppositely facing channels 106 bound together by flat sections 107 welded to their side walls, thus the member of the section of Fig. 19 is comprised of a single channel member 106 and opposed flat members 107 welded to the side walls, and thus, the member of Fig. 20 is comprised of three channels 106 and opposed flat members 107 welded to each side wall. These relatively heavy and strong cross sections are used intermediate the trucks where the stresses are extremely heavy, but in the overhang at the trailing end 42 the sections of Figs. 26 and 27 are used, a simple channel 106 or two channels 106 welded bottom to bottom. It is characteristic of all of these diagonal sections however that the channels 106 themselves, as in Figures 26 and 27, or the channels 106 together with the flat side members 107, as in Figures 18 to 20 are of corresponding width and that this width accords with that of the channels 83 entering into the composition of the rail and with the widths of the posts 55, whereby they fit between the gussets which are themselves in the plane of the members 84 and take the place of these members in the post regions as hereinbefore described. Thus the longitudinally continuous channels 78, 86, 87 and 93 may be extended without diversion of the rectilinear course across gussets and walls 107 alike, since the outer surfaces of the gussets lie in one and the same plane. The same is true of the paneling attachments whereby the paneling may extend rectilinearly smoothly without diversion of the course. What is said of the rectilinear members is true also of the curvilinear members.

What is claimed is:

1. A vehicle body comprising a longitudinal series of transversely extending frames having vertically extending posts of channel section and vertically spaced longitudinally extending upper and lower rails therefor constituting chords of a truss, at least one of said chords being comprised of longitudinally continuous inner and outer channels having flanged side walls facing toward each other in juxtaposed position and welded through their flanges respectively to the bottom and side walls of the channel section of said posts.

2. In a vehicle body side wall truss structure, struts comprising channels having laterally flanged side walls and opening laterally of the truss and a chord comprising juxtaposed channels having flanged side walls which chord channels present toward each other and are welded by their flanges respectively, the one to the bottom walls of the channel section struts, and the other to the flanges of the channel section struts.

3. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and a closure for the space between the channel section chord elements comprising a third channel the side walls of which are welded to one juxtaposed pair of flanges of the first named channels of the chord.

4. In a vehicle body side wall truss structure, struts comprising channels having laterally flanged side walls and opening laterally of the truss and chords, at least one of which comprises juxtaposed channels having flanged side walls which chord channels present toward each other and are welded by their flanges respectively, the one to the bottom walls of the channel section struts, and the other to the flanges of the channel section struts, together with additional channels bridging both pairs of flanges of said chord channels and connected thereto through their side walls whereby the chords are constituted at large of box cross section.

5. In a vehicle body having side wall truss structures, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and a cover plate for certain of the flanged channel struts through which chord members are attached to the struts.

6. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and gusset members intervened in the attachment between the chord channels and the struts.

7. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and a closure for the space between the channel section chord elements comprising a third channel, the side walls of which are welded to one juxtaposed pair of flanges of the first named channels of the chord, and spacer strips intervened in the connection between the side walls of the intermediate channel and the flanges of the exterior channels.

8. In a vehicle body side wall truss structure, struts comprising channels having laterally flanged side walls and opening laterally of the truss and chords, at least one of which has juxtaposed channels having flanged side walls which chord channels present toward each other and are welded by their flanges respectively, the one to the bottom walls of the channel section struts, and the other to the flanges of the channel section struts, and gusset members on opposite sides of the struts intervened in the attachment between the chord channels and the struts, and diagonal bracing for the truss in the form of angular section members having flat inside and outside faces and being of a width fitting between the opposite gussets and connected with the chords and the struts through welding of their side walls to the gussets.

9. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and gusset members on opposite sides of the struts intervened in the attachment between the chord channels and the struts, and diagonal bracing for the truss in the form of channel section members of a width slightly less than the distance between the opposite gussets and connected with the chords and the struts through welding of their side walls to the gussets, together with reinforcements for the diagonal trusses in the form of longitudinally extending flat strips likewise welded to the side walls of the channel section members and to the opposite gussets.

10. In a vehicle body side wall truss structure, struts comprising channel having laterally flanged side walls and opening laterally of the truss and chords comprising justaposed channel having flanged side walls which chord channels present toward each other and are welded by their flanges respectively, the one to the bottom walls of the channel section struts, and the other to the flanges of the channel section struts, and a closure for the space between the channel section chord elements comprising a third channel, the side walls of which are welded to one juxtaposed pair of flanges of the first named channels of the chord, together with an extension from the opposite side wall of one of the first named channel section chord elements toward the juxtaposed side wall of the other, and connected to the flange thereof to constitute a jamb face for a closure opening.

11. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, together with a longitudinally extending chord reinforcement comprising a flat strip bridging the mouth of one of said channels and secured to the flanges thereon.

12. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, together with a longitudinally extending chord reinforcement comprising a flat strip bridging the mouth of one of said channels and secured to the flanges thereon, which reinforcing strip is of a width greater than the over-all width of the channel to which it is connected.

13. In a vehicle body side wall truss structure, struts comprising channels having laterally flanged side walls and opening laterally of the truss and chords comprising juxtaposed channels having flanged side walls which chord channels present toward each other and are welded by their flanges respectively, the one to the bottom walls of the channel section struts, and the other to the flanges of the channel section struts, and a closure for the space between the channel section chord elements comprising a third channel, the side walls of which are welded to one juxtaposed pair of flanges of the first named channels of the chord, together with an extension from the opposite side wall of one of the first named channel section chord elements toward the juxtaposed side wall of the other and connected to the flange thereof to constitute a jamb face for a closure opening, and a reinforcement for the chord structure as so defined comprising a flat strip intervened between the side wall of the intermediate channel and the flange of the flanking channel and projected to the said integral extension forming the jamb face and provided with a flanged connection therewith.

14. In a beam type skeleton frame for a vehicle body, struts comprising channels having laterally flanged side walls presenting laterally of the frame and inner and outer chord members comprising channels at an angle thereto having laterally flanged side walls, the flanges of one of which are welded to the flanges of the struts and the flanges of the other to the bottoms of the channels of the struts.

15. In a beam type skeleton frame for a vehicle body, struts comprising channels having laterally outwardly flanged side walls presenting laterally of the frame, and longitudinal chord members comprising through running inner and outer strips welded respectively, to the bottoms of the channels of the struts and to the flanges from the side walls thereof, at least the outer strip being a flanged channel welded to the struts through the flanges thereof.

16. In a beam type skeleton frame for a vehicle body, struts comprising channels, having laterally flanged side walls presenting laterally of the frame, and chords comprising channels at an angle thereto having lateral flanged side walls, the flanges of which are welded to the flanges of the struts, together with a longitudinal strip member welded in juxtaposition to one of said channel chord members and to the bottom walls of said struts.

17. In a vehicle body, a truss construction therefor comprising struts and chords of sheet metal in strip form, the struts being of angular cross section and having branches, one extending along the outside and the other along the inside of, and both parallel to, the wall of the vehicle, and the chord members being comprised of juxtaposed inner and outer through-running strips welded respectively to the inside and outside parallel branches of the said strut cross section, interposed strips of material connecting said inner and outer through-running strips intermediate the struts to form with said strips a channel cross section, and angular section diagonals having inner and outer arms secured at their ends, respectively, to the inner and outer walls of said channel cross-section.

18. In a vehicle body, a truss construction therefor comprising struts and chords of sheet metal in strip form, the struts being of angular cross section having branches, one extending along the outside and the other along the inside of, and both parallel to, the wall of the vehicle, and the chord members being comprised of juxtaposed inner and outer through-running strips welded respectively to the inside and outside parallel branches of the said strut cross section, at least one of the said through-running strips being of flanged channel cross section with its flanges secured to the struts.

19. In a vehicle body, a truss construction therefor comprising struts and chords of sheet metal in strip form, the struts being of angular cross section having branches, one extending along the outside and the other along the inside, and both parallel to, the wall of the vehicle, and the chord members being comprised of juxtaposed inner and outer through-running strips welded respectively to the inside and outside parallel branches of the said strut cross section, strip material of shallow channel cross section extending between and connecting the through-running chord strips, the side walls of said channel connecting strip being electrically welded to the edges of the through-running strips, and gussets extending across the struts and secured to the opposite branches of the struts and to said channel connecting strips on opposite sides of the struts, the gussets being interposed between the through-running chord strips and the adjacent branches of the struts.

20. In a vehicle body having a roof, a truss construction therefor comprising struts and chords of sheet metal in strip form, the struts being of angular cross section having branches, one extending along the outside and the other along the inside of, and both parallel to, the wall of the vehicle, and the chord members being comprised of juxtaposed inner and outer through-running strips welded respectively to the inside and outside parallel branches of the said strut cross section, the outer one of the through-running strips of the chord being of channel cross section presenting inwardly and a reinforcing plate of a width very much greater than the width of the channel closing the mouth of the channel and extending into the roof of the structure and having substantial longitudinal extent.

21. In a vehicle body side wall truss structure, struts comprising angular cross section members each having a web common to two flanges, the flanges extending along the inside and outside faces of the truss structure and a chord including an angular cross section through-running member having one of the flanges in abutting relation to one of the flanges of the struts and by which the struts are welded to the chord and another through-running member secured to the other flanges of the struts, and complementary members bridging the space between said chord members and forming a box cross section chord therewith, said strut extending through said box cross section chord.

22. In a vehicle body side wall truss structure, vertically extending angular cross section struts, and chords of box cross section attached to said struts, said chords including inner and outer members which are longitudinally continuous substantially throughout the length of the truss and a pair of spaced filler strips, extending between and secured, respectively, at the opposed margins of the inner and outer longitudinally continuous members and between the respective struts, said filler strips being rendered effectively continuous throughout the length of the truss through gussets extending across the struts and connected to the struts and to the filler strips on the opposite sides of the struts.

23. A side frame truss for a rail car comprising a longitudinally extending chord member of box shape in cross section, vertically extending posts and diagonal members, said chord member including a longitudinally extending member of channel shape attached to one side of the post by welding, and a second longitudinally extending member attached to the posts on the opposite side, said longitudinal members being substantially equal in strength whereby the truss has a longitudinally extending vertical plane of symmetry through the diagonals.

24. A side frame for light weight, high strength rail car bodies of truss construction having channel section truss elements fabricated from metal strips of relatively light gauge, said truss elements including vertical and diagonal struts and through running chord members on the inner and outer sides of said struts, at least the outer of said members being of flanged channel section secured to the struts through said flanges, said vertical struts having laterally extended flanges, and extending across the chord members and being secured to said chord members by spot welding their abutting flanges to said chord members, said diagonal members being of channel cross section and extending between the chord members and being secured thereto in their overlapping faces by spot welding, the chord members and vertical struts being equally balanced on each side of a plane of symmetry of the diagonals so that the loads of the diagonals are substantially equally distributed on each side of said plane.

25. A light weight, high strength vehicle body having a roof and an underframe, the principal load of which is carried by side trusses, each of said trusses including through-running chord members, vertical struts and diagonals of angular section each formed from light gauge sheet metal strips, said vertical struts having laterally projecting flanges and extending across the chord elements and being secured to said chord elements through said laterally extending flanges, transverse floor beams securing said trusses together, said vertical struts of the trusses extending below the main body of the bottom chord member and serving in that region to support the floor beams and the upper ends of said struts serving to support the roof, the diagonals of said truss elements being in a longitudinally extending vertical plane of symmetry of the truss elements and being adapted to distribute their loads to other members of the truss elements substantially equally on opposite sides of said plane.

26. A frame for vehicle bodies having a roof, side frames and transverse floor supporting beams, said floor supporting beams interconnecting said frames, said side frames being fabricated substantially throughout of light gauge sheet metal angular section truss elements, including through-running chord members, vertical struts, and diagonal members, some at least of which are closed by cover members to form box section members, said truss elements being in the main flanged in the edges and being arranged to have the flanges thereof overlap adjacent members, and to be secured to said adjacent members in the overlapping margins, substantially all of the truss elements being in balanced relation with respect to a longitudinally extending vertical plane of symmetry of the diagonals, the loading of the diagonals being distributed in substantially balanced relation to the other truss elements on the respective sides of the plane of the diagonals.

27. A frame for vehicle bodies having a roof, side frames and transverse floor supporting beams interconnecting said side frames, said side frames being fabricated substantially throughout of light gauge sheet metal angular cross section truss elements, including through-running chord members, vertical struts, and diagonal members, some at least of which are closed by cover members to form box section members, said truss elements being in the main flanged in their edges and being arranged to have the flanges thereof overlap adjacent members and to be secured to said adjacent members in the overlapping portions, the truss elements being interconnected in balanced relation with respect to a longitudinally extending vertical plane of symmetry of the diagonals whereby the loading of the diagonals may be distributed in substantially balanced relation to the other truss elements, certain of the vertical struts being continuous of the roof, said transverse floor beams being anchored with respect to such posts so that the effective line of anchorage is in the plane of the diagonals for a minimum torsional reaction on the truss at large.

28. In a vehicle body a truss construction therefor comprising struts and chords formed from sheet metal strips, the struts being of angular cross section and having branches, one extending along the outside and the other along the inside of, and both parallel to, the wall of the vehicle, and the chord members being comprised of juxtaposed inner and outer through running elements welded, respectively, to the inside and outside parallel branches of said strut cross section, at least the outer of said through running chord elements being of flanged channel cross section welded to the outside branch of the strut cross section through the flanges thereof.

29. In a vehicle body side wall truss structure, struts comprising angular section members having inner and outer longitudinally extending flat portions and chords, at least one of which comprises juxtaposed longitudinal strips welded, respectively, the one to the outside longitudinal flat portion and the other to the inside such portion of the strut, together with vertically spaced channel section members at least one of which is outwardly facing, bridging the marginal portions of the juxtaposed strips of the chord members and connected thereto through the side walls of said channel section members, whereby the chords are constituted at large of closed box cross section.

30. In a vehicle body, a truss construction therefor comprising struts and chords of sheet metal in strip form, the struts being of angular cross section and having branches, one extending along the outside and the other along the inside of, and both parallel to, the wall of the vehicle and the chord members being composed of juxtaposed inner and outer through running strips welded, respectively, to the inside and outside parallel branches of said strut cross section, interposed strips of material connecting said inner and outer through running strips intermediate the struts and gussets extending across the struts and secured thereto and to the adjacent ends of the interposed strips.

31. In a vehicle body side wall truss structure, struts comprising angular section members having longitudinally extending inner and outer flat portions and chords, at least one of which has juxtaposed inner and outer strips welded, respectively, the one to the outside flat longitudinally extending portion and the other to the inside flat longitudinally extending portion of the strut, and gusset members on opposite sides of the struts intervened in the attachment between the chord strips and the struts, diagonal bracing for the truss in the form of an angular section member having flat inner and outer faces and of a width fitting between the opposite gussets and connected with the chords and struts through welding of their flat inner and outer faces to the gussets, and longitudinal spacing strips extending between the struts and connecting the outer and inner strips of the chords and fitting between said gussets at their ends and welded thereto.

32. In a vehicle body, a truss construction comprising struts and chords of sheet metal in strip form, the struts being of angular cross section and having branches, one extending along the outside and the other along the inside of, and both parallel to, the wall of the vehicle, and the chords comprising a top chord adjacent the roof, an intermediate chord below the window openings and a bottom chord adjacent the floor line, at least said intermediate and bottom chords being comprised of juxtaposed inner and outer through running strips welded, respectively, to the inner and outer parallel branches of said strut cross section, and diagonals of angular cross section interconnecting said chords and struts, the diagonals being secured to the chords and struts substantially in the planes of the outside and inside branches thereof, said struts being the side posts of the vehicle body supporting the roof at the top and extended downward below the main body of the bottom chord, said downwardly extending portions providing means for the attachment of floor beams.

33. In a vehicle body a truss construction comprising struts and chords of sheet metal in strip form, the struts being of angular cross section and having branches, one extending along the outside and the other along the inside of, and both parallel to, the wall of the vehicle, and the chords comprising a belt line chord below the window openings and a bottom chord adjacent the floor line, said chords being comprised of juxtaposed inner and outer through running strips welded, respectively, to the inside and outside parallel branches of said strut cross section, diagonals of angular cross section interconnecting said chords and struts, the diagonals being secured to the chords and struts substantially in the plane of the outside and inside branches of the struts whereby the loading of the diagonals is distributed in substantially balanced relation to the other truss elements on the respective sides of the plane of symmetry of the diagonals.

EARL J. W. RAGSDALE.
ALBERT G. DEAN.